United States Patent [19]
Holbert

[11] Patent Number: 5,400,841
[45] Date of Patent: Mar. 28, 1995

[54] POLE FRAMING APPARATUS

[76] Inventor: John C. Holbert, 5815 SW. West Hills Rd., Corvallis, Oreg. 97330

[21] Appl. No.: 285,954

[22] Filed: Aug. 4, 1994

Related U.S. Application Data

[63] Continuation-in-part of Ser. No. 134,553, Oct. 7, 1993, Pat. No. 5,358,018.

[51] Int. Cl.6 .................... B27C 9/00; B27C 3/00; B27B 1/00; B27M 1/08
[52] U.S. Cl. .................... 144/1 A; 144/1 R; 144/2 J; 144/3 H; 144/356; 144/365; 144/368; 269/56; 269/58; 269/63; 408/3; 408/35; 408/24; 408/26; 408/70
[58] Field of Search .................... 269/55, 56, 58, 63; 408/3, 31, 33, 35, 50, 69, 70, 22, 24, 26; 144/1 R, 1 A, 2 R, 2 J, 356, 365, 368, 3 R, 3 A, 3 B, 3 C, 3 H, 133 R

[56] References Cited

U.S. PATENT DOCUMENTS

| | | | |
|---|---|---|---|
| 1,610,623 | 12/1926 | Shipley | 144/3 H |
| 1,667,063 | 4/1928 | Valentine | 144/2 J |
| 1,802,824 | 4/1931 | McNeil | 144/3 H |
| 2,347,791 | 5/1944 | Onsrud | 144/1 A |
| 2,781,802 | 2/1957 | Pence | 144/2 J |
| 3,092,158 | 6/1963 | Ellerman et al. | 144/2 J |
| 3,833,033 | 9/1974 | Hurn | 408/70 |
| 4,071,060 | 1/1978 | Busch | 144/3 H |
| 4,519,429 | 5/1985 | Dreese | 144/356 |

Primary Examiner—W. Donald Bray
Attorney, Agent, or Firm—Robert L. Harrington

[57] ABSTRACT

An automatic machine for performing framing operations on a power pole. The machine is controlled by a programmable logic control and interchangeable programs are provided to control the operation of the machine according to a pole frame specification. Poles to be framed are received on a primary conveyor. The poles are sequentially scanned for length and position and are transferred in sequence to a longitudinal feed station where the poles are oriented on a first set of supports. An end of the pole is clamped to a movable carriage to maintain the pole orientation. The pole is fed through a movable rotatable tool ring either by movement of the pole clamp carriage or movement of the tool ring. The tool ring supports tooling to perform the framing operation on the pole. The programmable logic control coordinates the movement of the pole clamp carriage, the movement of the tool ring and the rotation of the tool ring to position the tools in the proper relation to the pole. Self centering supports are provided to center the longitudinal axis of the pole on the rotational axis of the tool ring. The programmable logic control operates the tools of the tool ring to perform all the operations required in framing the pole to its specification. An additional tool ring is provided adjacent the first tool ring for supporting drilling tools for ground line drilling the base of the pole to enhance subsequent treatment of the pole with a wood preservative.

11 Claims, 8 Drawing Sheets

POLE FRAMING APPARATUS

RELATED APPLICATION

This application is a continuation-in-part of application Ser. No. 08/134,553, filed Oct. 7, 1993, entitled POLE FRAMING APPARATUS, and now U.S. Pat. No. 5,358,018.

FIELD OF THE INVENTION

This invention relates to power pole framing and more particularly to an apparatus that shapes a pole in preparation for attachment thereto of a cross arm or mast, various types of electrical boxes and further the provision of ground line drilling and roofing for the pole.

BACKGROUND OF THE INVENTION

Wood power poles are commonly used for supporting power lines. Many thousands of wood power line poles crisscross the country and interconnect electrical power sources with users of electrical power. The process of installing power poles is costly and the poles are treated with preservatives to retard deterioration of the wood as occurs when exposed to all kinds of weather conditions including rotting which rapidly occurs to the portion of the pole that is embedded in the ground.

A power pole is typically provided with a cross arm or mast suitably braced for carrying multiple power lines in spaced parallel relation. Also, electrical boxes, cable television boxes, transformers and the like are often attached to the pole. All of these various paraphernalia require that holes and/or flat spots be provided on the pole. Also, the poles installed along a designated stretch are cut to the same length and are provided with "roofs" that are all placed in alignment when installed. Often holes are drilled in the lower end portion of the pole to be embedded underground to enhance treating the pole with a wood preservative to extend the life of the pole.

All such flats, roofs, holes, and other shaping of the pole is referred to as framing. The framing precedes treatment, e.g., with a wood preservative so that all exposed surface areas of the pole are treated. As will be appreciated, the various shapes provided on the pole must be precisely located, e.g., relative to the roof tops so that with the roof tops aligned, the various flats, holes, etc. are properly located on the pole. Still further, poles are often not precisely straight, i.e., they may have a slight bow of several inches over a hundred foot length.

Prior to this invention pole framing has been primarily accomplished manually. A pair of spaced apart elongated supports were provided to support the posts at each end. These supports allowed the post to roll so that the bow of the pole drapes down. Thus, the framer knew that the top side of the laterally supported pole would be the front side of the pole when installed. The framer thus simply proceeded to measure and cut or plane or drill as needed to frame the pole.

The process of framing is tedious, time consuming and expensive, and is one of the major cost components of a pole made ready for installation as a power pole. It is understood that one attempt was made to automate the framing procedure. A pole was mounted on supports and a motorized tool carrier supported on the pole traveled along the pole length and in the process performed the shaping operations. It saved little in cost of framing and was short lived. Nothing more about this attempt at automation is known.

The present invention is an apparatus for framing a wooden pole by framing a wooden pole while the pole is substantially stationary.

BRIEF DESCRIPTION OF THE PRESENT INVENTION

It is an objective of the present invention to automate the framing process. The basic premise of the invention is the provision of two coordinated operations. The first is the provision of a motor operated rotatable tool ring equipped with the appropriate power operated tools for shaping or framing a pole. The second is the provision of a motorized pole feeder that feeds the properly oriented pole through the tool ring. The two operations are coordinated through a motor control device, e.g., a PLC (Programmable Logic Control).

The preferred embodiment of the invention includes a lateral conveyor for feeding the poles laterally to a "stop and feeder" which places the poles sequentially onto a lengthwise feeder. Located relative to the lateral conveyor is a primary scanner that scans the pole for length and determines that the pole is the required length. (Typically the system will be set for a desired framing shape for a specific length of pole. The primary scanner merely confirms for the PLC that the pole is the right length.) The primary scanner also determines the position of the lower end of the pole.

The lengthwise conveyor includes a front and rear vee support (the legs of the vee support formed by idler rollers). The front vee support is laterally retractable and the rear vee support is mounted on a carrier (carriage) that also carries a pole clamp located rearwardly of the rear vee support. The pole is deposited onto the front and rear vee supports which allows the pole to roll to the position with the front side (concave side) facing up. The pole clamp then clamps the rear end of the pole to prevent turning during the succeeding feeding operation.

Spaced forwardly of the front vee support is the tool holder ring. Positioned in front of and at the rear of the tool holder ring are self centering vee supports (opposing vee clamps). The opposed upper and lower vee of each centering vee support opens and closes together so that the center of the centering vee supports are always on the axis of the tool ring. Thus, when a pole is clamped by the front and rear centering vee supports, the section of the pole located in the tool ring is on the tool ring axis.

The pole supported on the centering vee supports is moved lengthwise by movement of the carriage toward the tool holder ring. A secondary scanner forward of the front vee and prior to the tool holder ring establishes the precise length of the pole (the PLC knows the position of the rear end clamp and it detects the leading end of the pole via the scanner). When the pole is moved into and centered in the first centering vee, the front support vee is retracted. The pole is moved into the tool holder ring and the PLC stops the carriage and thus the pole at the desired position. The tool holder ring is rotated to the desired position and the pole is cut to length and in the process the "roof" of the pole is formed. Subsequent operations include the intermittent feeding of the pole, the rotation of the ring, and the operation of the various tools to provide the desired framing of the pole.

The operation of ground line drilling may preferably require a secondary tool ring which would be positioned adjacent the multiple tool holder ring described above. In any event, the pole is stepped through the tool holder ring or rings until the framing of the pole is completed. A tilt pan receives the pole length as it exits the tool ring or rings and when the full length of the pole is received onto the tilt pan, the tilt pan tilts the framed pole onto skids that retain the poles until ready for transfer such as to a wood preserving treatment station.

In another embodiment, the present invention has a set of supports for receiving the pole to be framed, a pole clamp for clamping one end of the pole, a movable tool ring for performing the operations necessary in the framing of a pole, and a computer for controlling the operation of the pole framing apparatus. The tool clamp and one support are mounted on a carriage which is movable to adjust to the length of the pole. The other support is positioned strategic to receive the other end of the pole. The pole clamp clamps the end of the pole to prevent rotation of the pole during the framing operation. A tool ring which is mounted on its own carriage is movable along the length of the pole to perform all the necessary framing operations. The tool ring is rotatable so that the tools may be presented to the pole at the desired locations. The tool ring incorporates a pair of self-centering supports that align the pole substantially along the rotational axis of the tool ring.

Refer now to the drawings and the detailed description for a complete understanding of the invention.

DESCRIPTION OF THE PREFERRED EMBODIMENT

Figure 1:
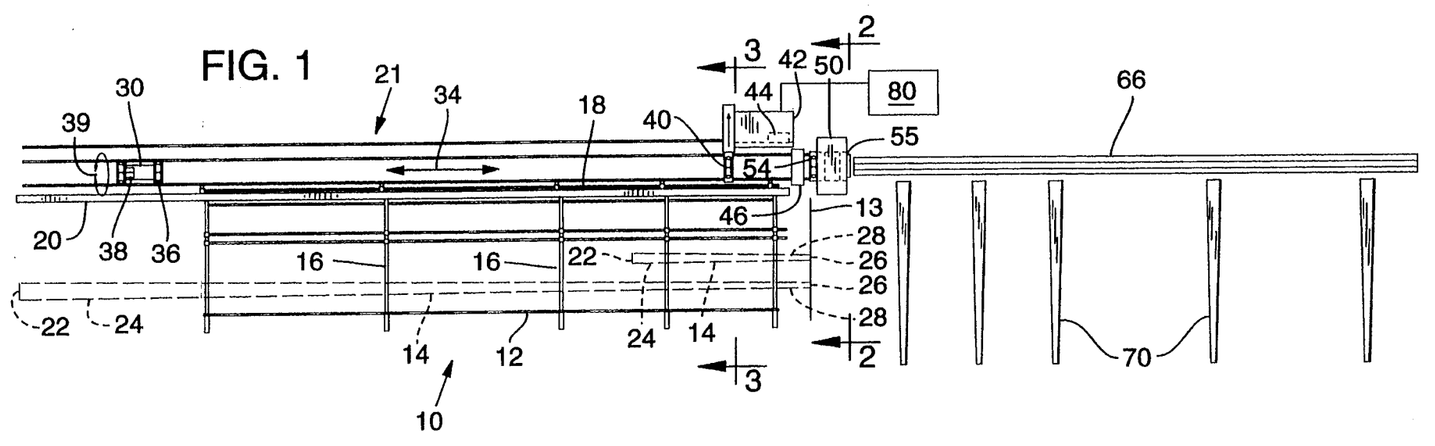
FIG. 1 is a schematic top plan view of an automatic pole framing machine of the present invention.

Refer now to FIG. 1 of the drawings which schematically illustrates a pole framing machine 10 of the present invention. The machine 10 is arranged to perform all operations necessary in the framing of a pole. Pole framing refers to the operations of drilling holes, milling or otherwise forming flats, shaping a roof structure, cutting the pole to length and other operations to prepare a pole for its intended use. The pole is framed to facilitate mounting mast heads or cross members, bracing members, ancillary equipment such as transformers, switch gear and other items. In addition the pole is drilled to facilitate treating the end of the pole that will be inserted into the ground with a wood preservative. The operation of the machine 10 is controlled by a programmable logic control 80 (PLC). The PLC may also be referred to as a computer.

The machine 10 has a lateral conveyor 12 driven by a suitable motor for receiving poles 14 to be framed. The conveyor 12 has carriers such as chains 16 for laterally feeding the poles 14 to a longitudinal feed station, generally indicated by the numeral 21. The longitudinal feed station 21 is adjacent the exit end of the conveyor 12 and is arranged to feed the pole 14 lengthwise (longitudinally) into and through a rotatable tool ring 50. A powered stop and feeder mechanism 18 is provided on the conveyor 12 to ensure that one pole at a time is transferred to the longitudinal feed station 21. A preliminary scanner 20 is provided on the conveyor 12 for scanning the pole 14 for length and to determine the position of the lower end 22 of the pole 14. The longitudinal feed station 21 includes a carriage 30 movably mounted on tracks 32 provided adjacent the exit end of the conveyor 12 and the carriage 30 is movable in the directions indicated by arrow 34 by a suitable motorized arrangement. Mounted on the movable carriage 30 is a vee support 36 and a pole clamp 38. Another vee support 40 is provided that is alignable with the vee support 36 with the vee support 40 being positioned near an operator's station 42. The vee support 40 is movably retractable out of the travel path of the movable carriage 30 by a suitable motor. The operator's station 42 is positioned substantially as shown and includes operators controls 44 for operating the machine 10. A secondary scanner 46 is provided to scan the pole 14 received in the longitudinal feed station 21 to determine the exact length of the pole 14. A rotatable tool ring 50 is provided in alignment with the travel path of the carriage 30. The rotating tool ring 50 supports and positions the tooling necessary in the framing of the pole 14. The tooling includes, but is not limited to, saws, drill spindles, router, planing and shaping spindles, suitable mechanism for stamping or attaching identification logo and the like. The tool ring 50 is rotatable about its axis of rotation 52 by a suitable motorized drive arrangement.

Figure 2:
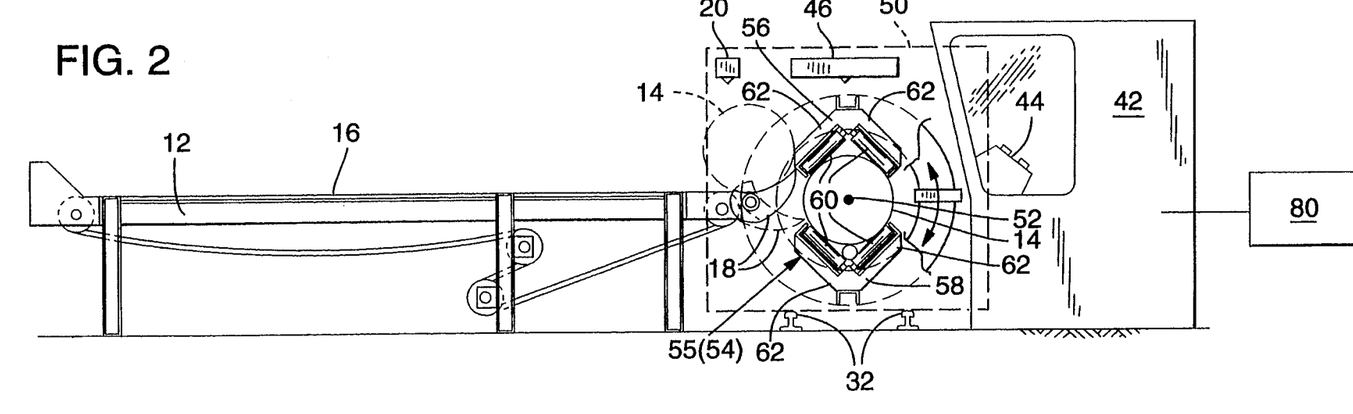
FIG. 2 is a view of the framing machine of the present invention as viewed on view lines 2—2 of FIG. 1.

Self centering devices (supports) 54, 55 (see FIG. 2) having an upper vee support 56 and a lower vee support 58 are provided on each side of the rotating tool ring 50. The upper support 56 and the lower support 58 are opposed to each other and are coordinated to be movable toward and away from each other such that the midpoint between the upper support 56 and the lower support 58 is at all times coincident with the rotational axis 52 of the tool ring 50. The upper support 56 and the lower support 58 have rollers 60 mounted on their legs 62 to facilitate moving the pole 14 through the supports 54, 55 which will later be explained. A tilt pan 66 is provided that is aligned with the tool ring 50 and the carriage 30. The tilt pan 66 will receive poles 14 as they are fed through the tool ring 50. The tilt pan 66 is tiltable in a known manner to eject the poles 14 onto receiving skids 70.

Operation

Figure 4:
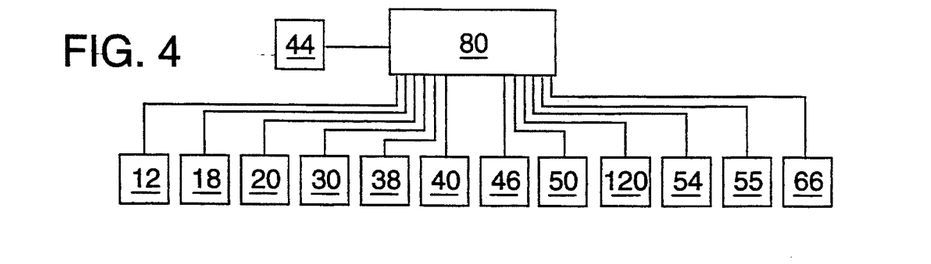
FIG. 4 is block diagram of a programmable logic control of the machine of the present invention.

The machine 10 is controlled by a PLC 80 in conjunction with the operator's controls 44. The PLC 80 is programmable to handle all of the necessary operations of the machine 10 to perform the desired framing configuration of poles 14. As illustrated in the block diagram of FIG. 4, the PLC 80 is interconnected to the operator's control 44 and the controllable components of the machine 10. The PLC 80 controls the conveyor 12 to feed the poles 14 laterally to the stop and feeder mechanism 18. The preliminary (primary) scanner 20 inputs scan data to the PLC 80 as to the length and the position of the lower end 22 of the pole 14. The carriage 30 is positioned to receive the lower end 22 of the poles in supporting vee 36 with end clamp rearwardly of end 22.

The PLC 80 operates the stop and feed mechanism 18 to transfer one pole 14 at a time to the longitudinal feed station 21. The PLC 80 controls the movement of the carriage 30 and operation of the pole clamp 38. The pole clamp 38 is initially moved into clamping engagement with the pole end 22. The secondary scanner 46 inputs scan data to the PLC 80 as to the exact length of the pole 14 determined relative to the position of the end clamp 38. The PLC controls the front and rear self centering supports (clamps) 54, 55 and controls the retraction and extension of the movable vee support 40. The functions are performed as the pole is moved by carriage 30. The PLC further coordinates the carriage movement with rotation of the tool ring 50 to position a tool member in the proper relation to the pole 14 to perform a programmed operation.

As one operation is completed, the PLC will advance the carriage 30 to thus advance the pole 14 to the next desired location and will rotate the tool ring (if necessary) to present the required tool to perform the next operation. Upon completion of the framing operation, the pole will be received on the tilt pan 66 and the PLC 80 will tilt the tilt pan 66 to discharge the pole 14 onto the skids 70. The operator's control 44 provides manual operation of the components of the machine 10. The operator may for example rotate the tool ring 50 to any desired position to facilitate changing tools or tooling, position the carriage 30 to a desired position, extend or retract the vee support 40, open or close the self centering supports 54, 55 and so forth.

The step-by-step operation as performed by the machine will now be described. Poles 14 are placed or deposited on the lateral conveyor 12 with the upper end 26 of the pole 14 being positioned in close proximity to the side 13 of the conveyor 12. The end 26 of the pole 14 is positioned so that as the pole 14 is transferred to the longitudinal feed station 21 by the stop and feeder mechanism 18, the end portion, generally designated by the numeral 28, of the pole 14 will be received on the vee support 40. FIG. 1 illustrates two poles 14 having a great variation in length. This is to illustrate the capability of the machine 10. In actual practice, it is preferable to batch frame multiple poles, i.e., poles having near the same length to be similarly configured for efficiency of processing, handling, storage and inventory control.

As the pole 14 is being conveyed laterally by the conveyor 12 to ultimately reside on the stop and feeder mechanism 18, the preliminary scanner 20 will scan the pole 14 for length and will determine the position of the lower end 22 of the pole 14. The scanned information from the scanner 20 is input to the PLC 80 and the PLC 80 will position the carriage 30 based on the position of the lower end 22 of the pole 14 and will extend the retractable vee support 40 to a position of alignment with the vee support 36. (See FIG. 3) The carriage 30 is positioned so that the lower end portion (base) of the pole 14, generally designated by numeral 24, of the pole 14 will be received on the vee support 36 of the carriage 30 when the pole 14 is transferred to the longitudinal feed station 21 by the stop and feeder mechanism 18. The carriage is positioned such that the clamp 38 on the carriage 30 will be strategically positioned relative to the lower end 22 of the pole 14 when the pole 14 is transferred to the vee supports 36 and 40 of the longitudinal feed station 21. When the carriage 30 is properly positioned, the PLC 80 will operate the stop and feeder mechanism 18 to transfer a pole 14 onto the vee support 36 of the carriage 30 and the vee support 40 positioned near the side 13 of the conveyor 12.

Poles are rarely straight and most have some curvature along their longitudinal length. The pole 14 when placed on the vee supports 36 and 40 will, if the curvature of the pole is not already downwardly directed, rotate or roll by the action of gravity to orient the pole 14 with the curvature of the pole downward. The pole 14 thus oriented is ready to be clamped by the pole clamp 38. The pole clamp 38 is preferably of the type that is self centering and will clamp the end 22 of the pole 14 with the longitudinal axis of the pole being aligned with the rotational axis of the tool ring 50. The clamp 38 will maintain the pole 14 in its oriented position (curvature down) and will prevent rotation of the pole during the framing process. However, there may be occasions where a slight rotative reorientation of the pole is desired, e.g., where the operator wishes to work around a defect. To accommodate such occurrences, the pole clamp 38 is rotatable, e.g., $\pm 15°$ to allow the operator to shift the orientation of the pole as indicated by arrows 39 in FIG. 6.

The pole 14 is moved toward the tool ring 50 by movement of the carriage 30. The pole 14 is scanned by the secondary scanner 46 to determine the exact length of the pole 14. The position of the carriage 30 and thus the position of the end 22 (in the clamp 38) of the pole 14 is known by the PLC 80 and the scan data from the scanner 46 will determine the exact length of pole 14. As the pole is fed into the tool ring 50 the lower support 58 of the first set of self centering vee supports 54 will engage the end portion 28 of the pole 14. The first set of vee supports 54 will be closed to center the end portion 28 of the pole 14 on the rotational axis 52 of the tool ring 50. The vee support 40 is then retracted out of the travel path of the movable carriage 30. The PLC 80 will feed the carriage 30 to position the end 26 of the pole 14 strategic to a saw of the tool ring 50. The PLC 80 will then rotate the tool ring, if necessary, to position the saw in the preferred arrangement and the saw will cut the pole 14 to the desired length and in the process will form a roof 90 on the end of the pole 14 as shown in FIG. 5.

Figures 3, 5:
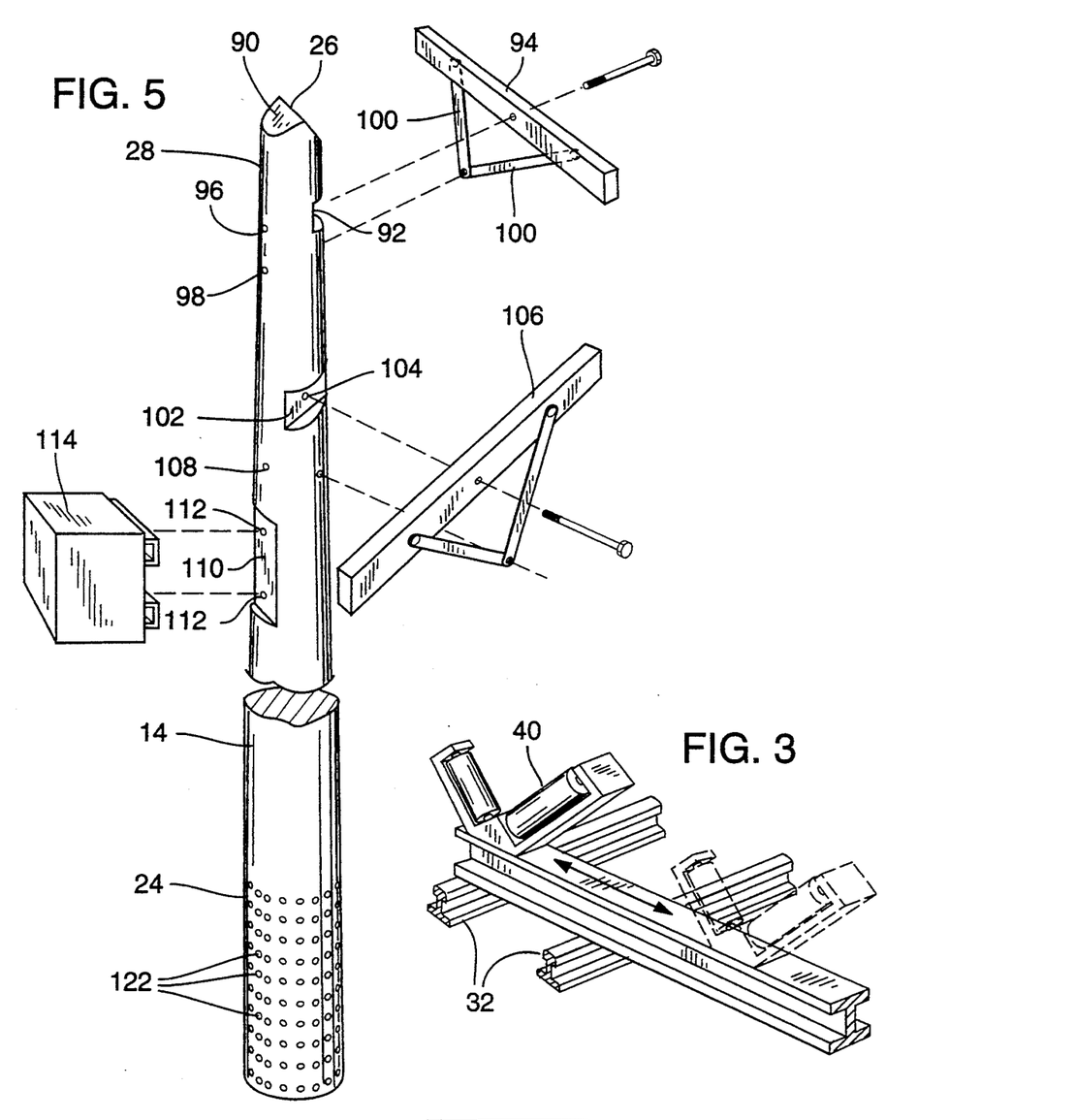
FIG. 3 is a perspective view of the front vee support of the framing machine of the present invention as viewed generally on view lines 3—3 of FIG. 1.
FIG. 5 is a view of a pole framed on the machine of the present invention.

FIG. 5 illustrates a pole 14 that has been framed to one specification. It will be appreciated that the requirements for individual poles may vary and the illustration is provided for example only. It is not the intent to cover all of the variations encountered in the framing of poles but the example is given to provide an understanding of the possibilities afforded by the pole framing machine of the present invention.

The carriage 30 is fed further which moves the pole 14 through the tool ring where the newly formed end 26 is engaged by the second set of self centering supports 55. The two sets of supports 54, 55 in combination will maintain the longitudinal axis of the pole basically coincident with the rotational axis 52 of the tool ring 50. The rollers 60 of the supports 54, 55 enable moving the pole 14 longitudinally without releasing the pressure of the supports 54, 55.

The PLC 80 moves the carriage 30 to position the pole 14 strategic to the tool ring to perform the next operation. Referring to the example illustrated in FIG. 5, the next operation is the forming of the flat 92. The flat 92 is provided for the mounting of the cross arm 94. The tool ring 50 is rotated as required by the PLC 80 to present the tool for producing the flat 92 to the proper orientation. The flat 92 is generated and the PLC 80 will rotate the tool ring 50 and move the carriage 30 as required to present a tool for drilling the hole 96 strategic to the flat 92. The PLC 80 will then move the carriage 30 to position the pole in the desired position to drill the hole 98 for attaching the bracing members 100 of the cross arm 94. The PLC 80 then feeds the carriage 30 to position the pole 14 for the formation of the flat 102 and rotates the tool ring 50 as required to position the tooling for generating the flat 102. After the flat 102 is generated the PLC 80 moves the carriage 30 and rotates the tool ring 50 as required to position the drilling tool for drilling the hole 104. The flat 102 is provided for mounting the cross arm 106. The PLC 80 thus controls the movement of the pole 14 and the rotation of the tool ring 50 to present the tools to produce the required formations. The PLC 80 will continue to feed the pole 14 and rotate the tool ring as required to present the tools required to produce the hole 108, the flat 110 and the holes 112. The flat 110 is provided to mount ancillary equipment, such as a transformer 114.

Figure 6:
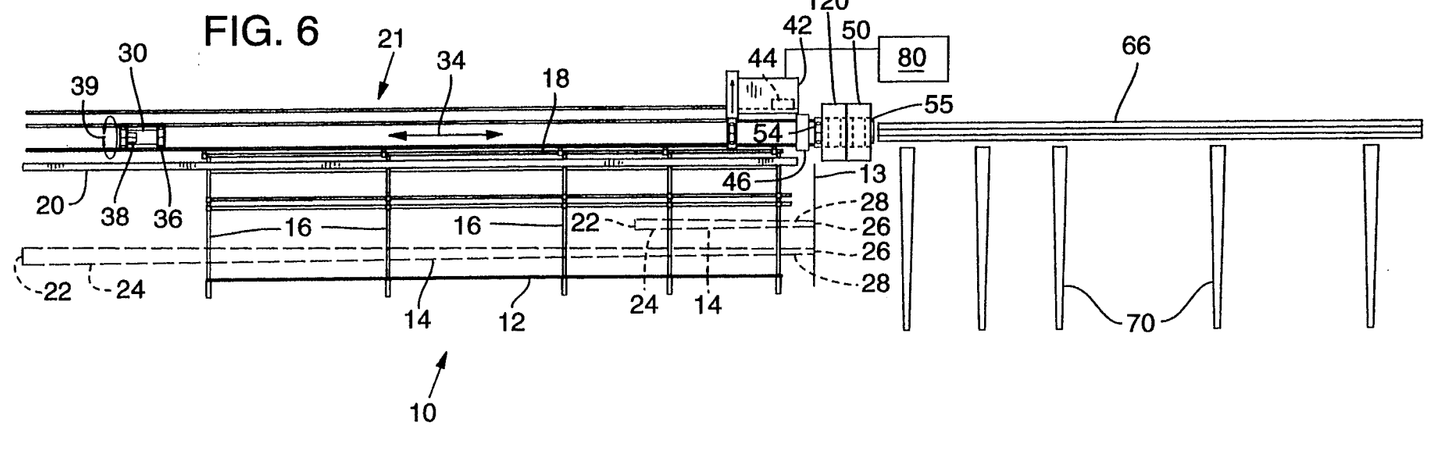
FIG. 6 is a view similar to FIG. 1 but showing is an alternate embodiment of the machine of the present invention.

An alternate embodiment is illustrated in FIG. 6. A second tool ring 120 arranged to drill multiple small diameter holes 122 in the lower end portion 24 (base) of the pole 14 is provided adjacent the tool ring 50 and between the front and rear self centering supports 54, 55. The multiple small diameter holes 122 drilled in the lower portion 24 of the pole 14 is often referred to as ground line drilling. The holes 122 are provided to facilitate treating the lower end portion 24 with a wood preservative. The tool ring 120 is rotatable in the same manner as the tool ring 50, it being rotatable about the axis 52. The tool ring 120 is typically arranged with tooling to drill multiple radial holes 122 into the lower end portion 24 of the pole 14. The tooling may also be arranged to drill multiple holes 122 that are inclined with respect to the longitudinal axis of the pole and are arranged in a somewhat parallel order. Other variations are contemplated. The PLC 80 will progressively move the pole 14 through the tool ring 120 and operate the drilling tools to drill the desired number of holes 122 at the desired spacing.

The PLC 80 will position the tools of the tool ring or rings to perform the programmed operations on the pole 14. Not all poles have the same framing operation, since the requirements of the poles vary depending on their intended usage. Some for example may only need a cross arm, while others may need more than one cross arm, may need a flat for mounting ancillary equipment such as transformers, may require an additional hole or holes drilled for guy wires and the like. The PLC 80 is programmed to control the machine 10 to perform all the operations necessary in the framing of a particular pole. The tool ring 50 preferably also includes tooling to identify the pole by attaching a tag or stamping a number or other form of identification.

Figure 7:
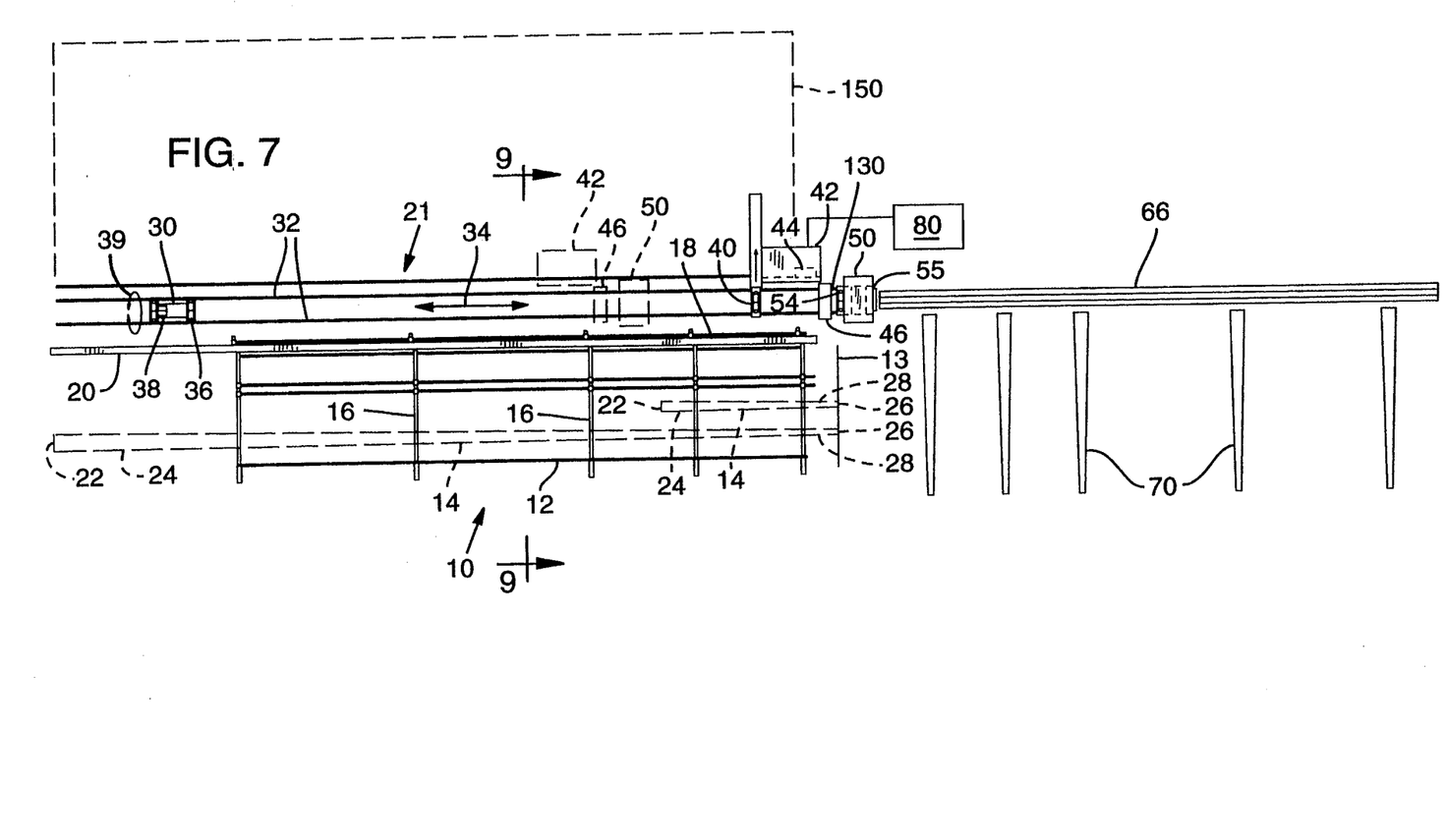
FIG. 7 is another embodiment of the pole framing machine of the present invention.

Refer now to FIG. 7 of the drawings which illustrates another embodiment of a pole framing machine 10 of the present invention. The machine 10 is arranged to perform all operations necessary in the framing of a pole. The operation of the machine 10 is controlled by a programmable logic control 80 (PLC). The PLC is also referred to as a computer.

A pole 14 that is to be framed by the pole framing machine 10 is received on an in-feed conveyor 12. The conveyor 12 is arranged to transport the pole 14 laterally and has carriers such as chains 16 to transport the pole 14 to the framing station, the framing station being generally indicated by the numeral 21. The conveyor 12 includes a stop and feed mechanism 18 to insure that one pole at a time will be delivered to the framing station 21. A scanner 20 is provided to scan the pole 14 to determine the length of the pole 14 and to establish the position of an end 22 of the pole 14. The framing station 21 includes a movable carriage 30 which supports a tool clamp 38 and a vee support 36. The framing station 21 includes another vee support 40 that is aligned with the vee support 36 on the carriage 30 and is positioned near side 13 at the exit end of the conveyor 12. The scan data from scanner 20 is input to the computer 80 and from this data computer 80 will position carriage 30 strategic to end 22 of the pole 14. When the carriage 30 is properly positioned, the stop and feed mechanism 18 will deposit the pole onto the supports 36 and 40. The tool clamp 38 will then clamp the end 22 of the pole 14. The pole 14 is thus in a position to be framed.

Figure 9:
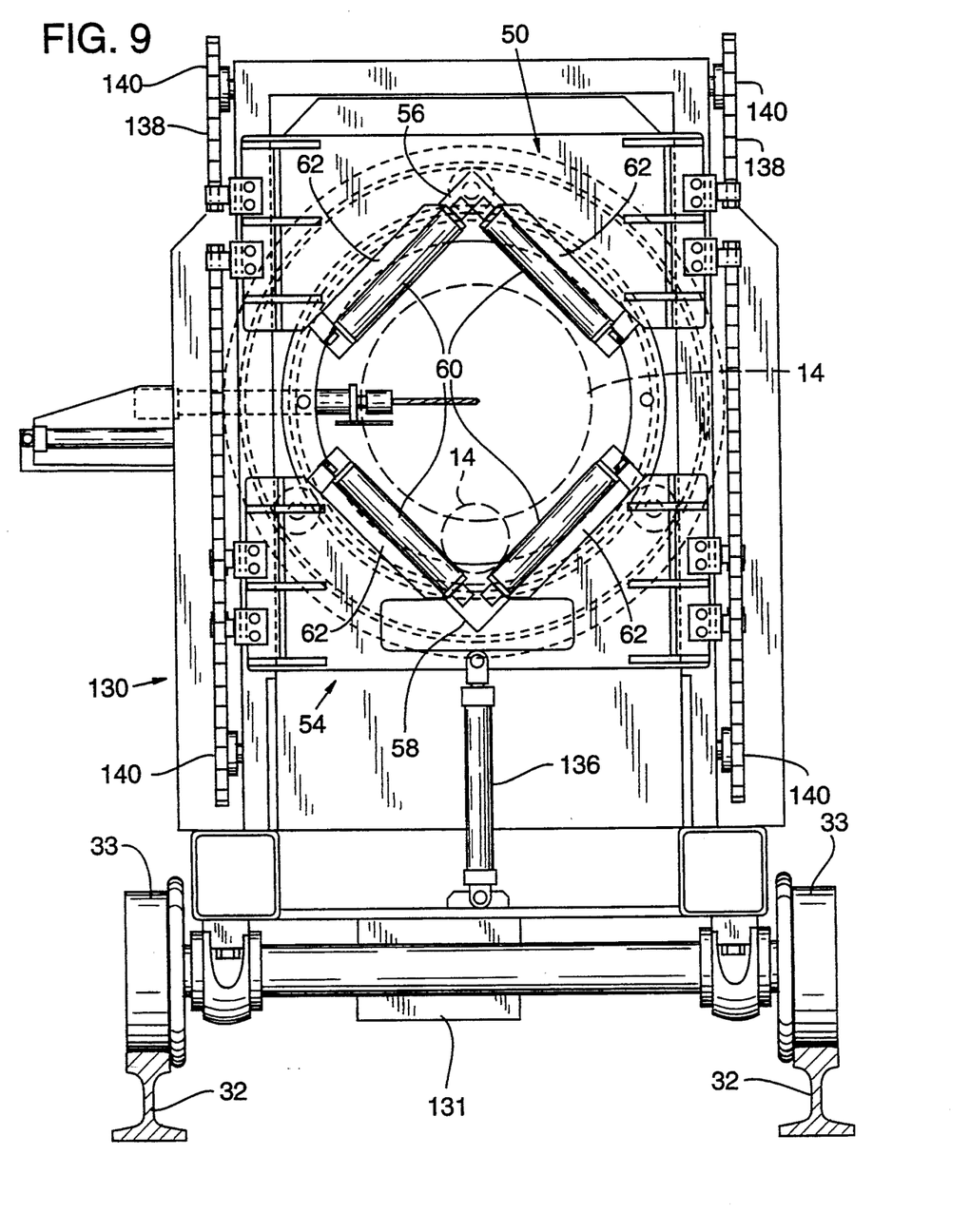
FIGS. 9 and 10 are views of the tool ring carriage of the machine of FIG. 7.
Figure 10:
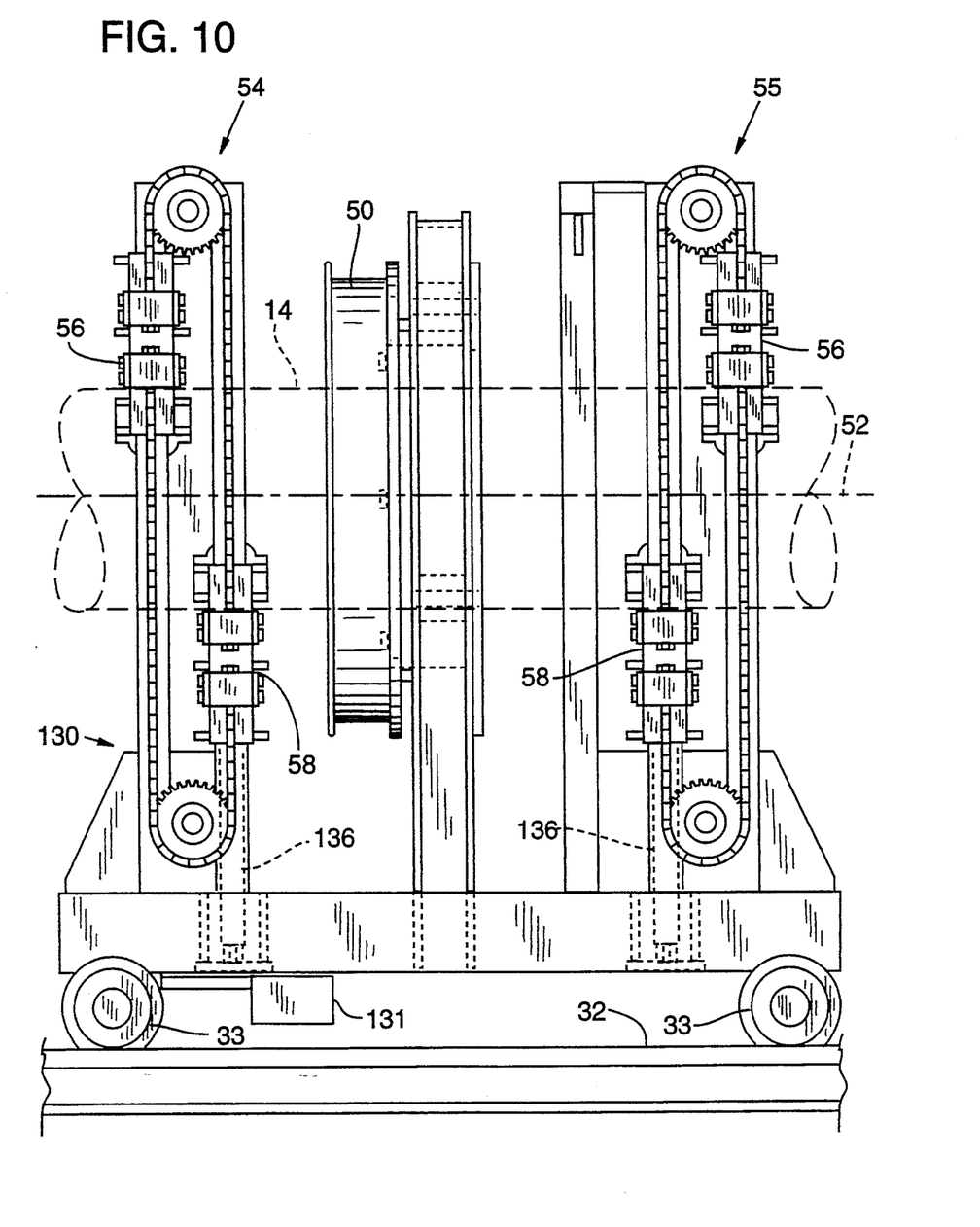

Referring also to FIGS. 9 and 10 the framing station 21 includes a tool ring 50 mounted on a movable carriage 130. The tool ring supports the tooling required in the framing operation of the pole 14. The tooling is well known in the industry and is therefore not detailed. The tool ring 50 is aligned with the tool clamp 38 on carriage 30. The carriage 30 and the carriage 130 are independently movable toward and away from each other as indicated by arrow 34 (FIG. 7). Mounted on the carriage 130 adjacent each side of the tool ring 50 are self-centering supports 54, 55. Each centering device (support) 54, 55 has an upper vee support 56 and a lower vee support 58. The upper support 56 and the lower support 58 are opposed to each other and are coordinated to be movable toward and away from each other such that the mid-point between the upper support 56 and the lower support 58 is at all times substantially coincident with a rotational axis 52 of the tool ring 50. The upper support 56 and the lower support 58 have rollers 60 mounted on their legs 62 to facilitate movement of the tool ring 50 relative to the pole 14 as the tool ring is moved along the length of the pole 14 by movement of carriage 130.

The carriage 130 is moved towards the carriage 30 under the operation of the computer 80. A secondary scanner 46 mounted on the carriage 130 will determine the position of end 26 of the log 14. As the carriage 130 is moved towards carriage 30, the end 26 of log 14 will engage the lower support 58 of the support device 54. The computer 80 will then control the operation of the self-centering support device 54 thus moving the upper support 56 and the lower support 58 toward each other to essentially position the longitudinal axis of the pole 14 in alignment with the rotational axis 52 of the tool ring 50. The vee support 40 is then retracted out of the travel path of the carriage 130. The carriage 130 will be moved to strategically position tooling such as a saw that is mounted to the tool ring 50 strategic to the end 26 of the pole 14. The computer 80 will control the operation of the saw, positioning it as necessary, to perform the operations as necessary in cutting the pole 14 to the desired length and in the process form a desired roof structure.

The computer 80 will then move the carriage 130 toward carriage 30 to a position where another operation on the pole is to be performed. As the newly formed end 26 engages the self-centering supports 55 the computer will close the supports to thus engage the pole 14. The pole 14 is now supported on the self centering supports 54, 55 which align the longitudinal axis of the pole 14 with the rotational axis 52 of the tool ring 50. In addition the end 22 of the pole 24 is supported in the tool clamp 38 of the carriage 30. The carriage 130 is moved towards carriage 30 to thus position the tool ring in a proper position to perform the operations required on the pole 14. In addition to positioning the tool ring, the computer 80, will rotate the tool ring 50 as necessary to properly present the tooling to the pole 14. As the carriage 130 progresses toward the carriage 30, the vee support 40 is again extended so that the end 26 of the pole 14 extending out of the tool ring 50 will be supported. When all of the framing operations have been performed on the pole 14 the tool ring 50 is moved by movement of the carriage 130 to a position adjacent side 13 of the conveyor 12.

Figure 8:
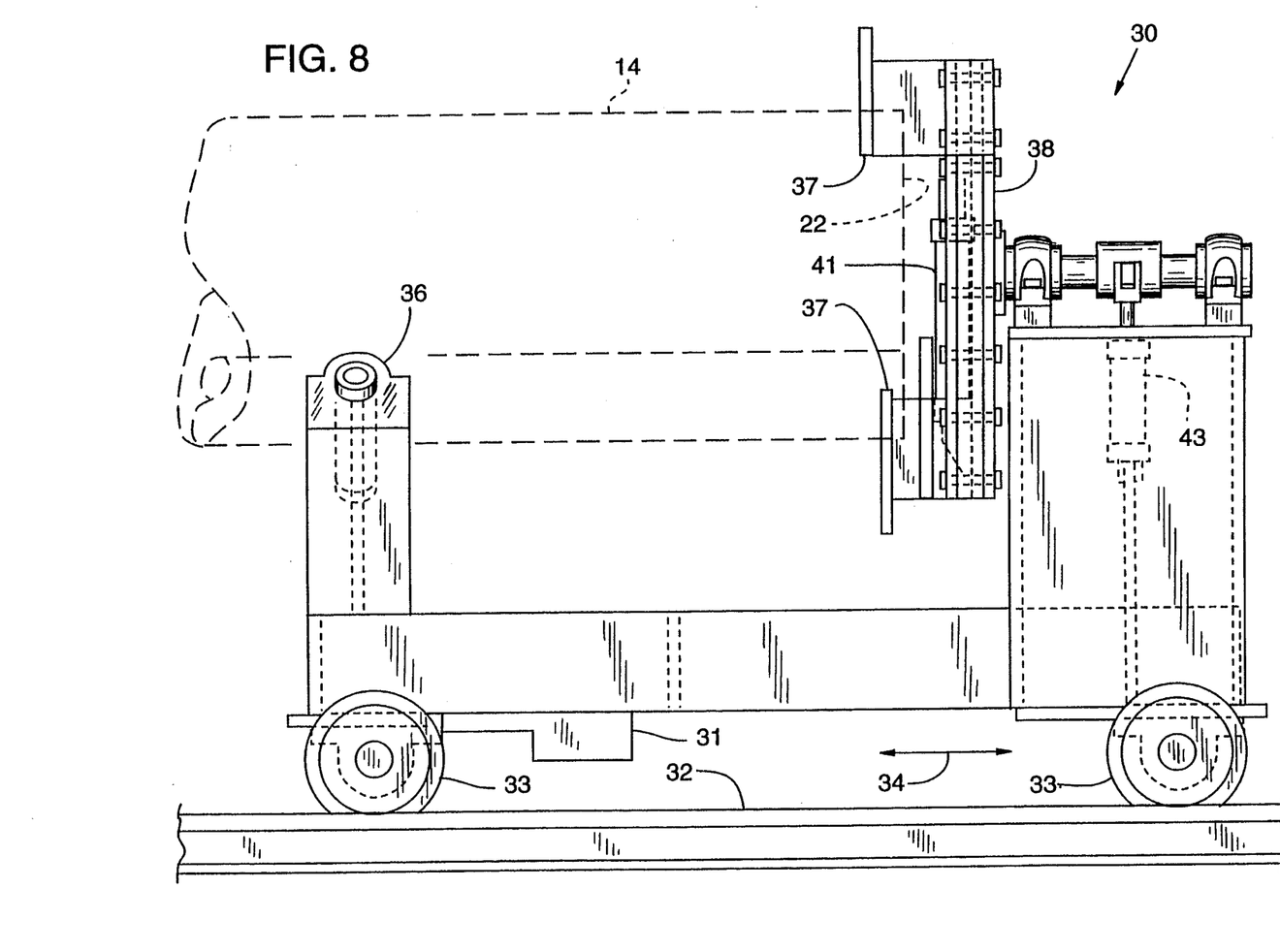
FIGS. 8 and 8A are views of the tool clamp and vee support carriage of the machine of FIG. 7.
Figure 8A:
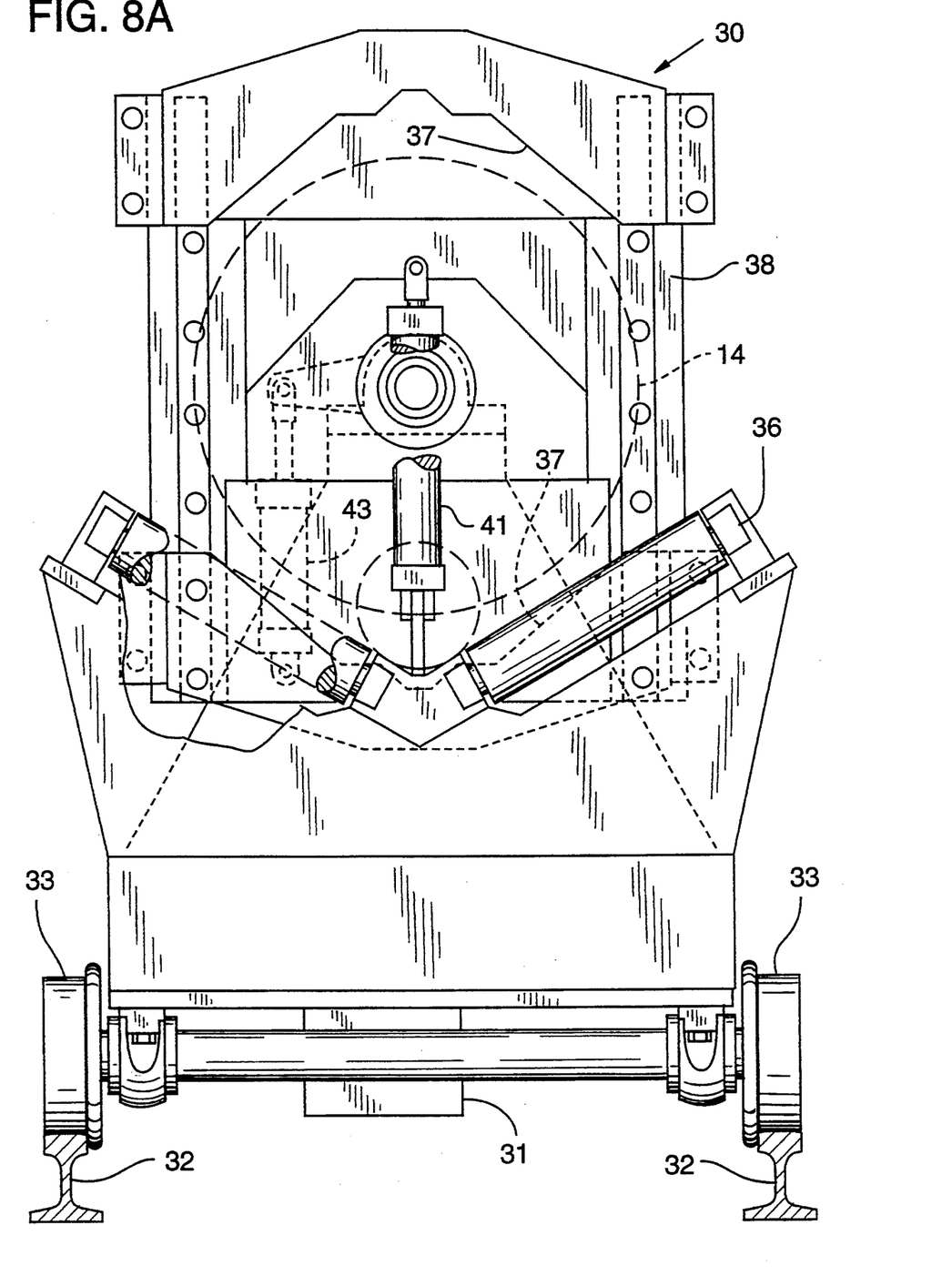

The carriage 30 is further illustrated in FIGS. 8 and 8A. The carriage 30 is mounted on wheels 33 and is movable on a set of rails 32 and is moved by a known motorized drive arrangement (power source) designated by the numeral 31. The carriage 30 is movable in the directions indicated by arrow 34. The movement of the carriage 30 is controlled by the computer 80 and/or the operator controls 44. The carriage 30 has a pole clamp 38 for clamping an end of the pole 14. As shown, the pole clamp 38 has opposed jaws 37 that are movable toward and away from each other by a cylinder 41 in a self centering arrangement. The opposed jaws are rotatable by a cylinder 43 so that a pole 14 clamped in the jaws 37 may be rotated as indicated by arrow 39 of FIG. 7. In this embodiment the opposed jaws 37 may be rotated plus or minus 15 degrees. This permits fine adjustment of the pole 14 for the framing operation. The vee support 36 is mounted on the carriage 30 and is provided to initially support the pole 14 when the infeed conveyor 12 delivers the pole 14 to the framing station 21. The opposed jaws 37 of the clamp 38 will then grip the end 22 of the pole 14. The jaws 37, which are self centering, will center the longitudinal axis of the pole 14 at end 22 with the rotational axis 52 of the tool ring 50.

The carriage 130 as illustrated in FIGS. 9 and 10 is mounted on wheels 33 and is movable on the rails 32 by a known motorized drive arrangement (power source) designated by the numeral 131. The movement of the carriage is controlled by the computer 80 and/or the operator controls 44. As previously mentioned, self centering supports 54, 55 are mounted on each side of the tool ring 50 and each support 54, 55 has an upper vee support 56 and a lower vee support 58. The vee supports 56 and 58 are movable toward and away from each other by a cylinder 136 connected to the lower support 58. A chain 138 connects the lower support 58 to the upper support 56 via sprockets 140. Thus as the lower support 58 is moved upwardly, the upper support 56 is moved downwardly and conversely as the lower support 58 is moved downwardly, the upper support 56 is moved upwardly. The self centering supports 54, 55 are controlled by the computer 80 and/or the operator controls 44.

The embodiments described and illustrated provide the capability of framing a pole in various modes of operation. The pole may be moved relative to the tool ring to position the pole for the desired operations (FIGS. 1-6) or the tool ring may be moved relative to the pole to position the tool ring relative to the pole for the desired framing operations (FIGS. 7-11). It is apparent that a combination of the two modes may also be utilized in the framing of a pole.

Those skilled in the art will readily recognize that modifications and variations may be made without departing from the true spirit and scope of the invention. A known out feed conveyor may, for example, be placed in line with the infeed conveyor 12 for receiving the framed pole. The out feed conveyor indicated by the dashed outline 150 in FIG. 7 would retrieve the framed pole 14 from the supports 36, 40 after the tool ring 50 has been moved to a position clear of the pole 14 such as to a position near side 13 of the conveyor 12. This arrangement would eliminate the need for feeding the framed pole 14 through the tool ring 50 onto the tilt pan 66.

The invention is therefore not to be limited to the illustrations and descriptions but is to be determined from the appended claims.

What is claimed is:

1. A pole framing apparatus comprising:
   a support;
   a movable carriage mounted on the support;
   a motor operated rotatable tool holder ring mounted on the carriage,
   power actuated tools mounted to the ring;
   a power source for movement of the carriage along said support for lengthwise feeding of stationary unframed poles through the tool holder ring; and
   a programmable control controlling rotation of the ring, controlling movement of the carriage for feeding of the poles through the ring and controlling actuation of the tools, and a program provided for said programmable control to control movement of the carriage to feed poles in a selected manner through the tool holder ring, to rotate the tool holder ring to selected rotative positions, and to operate selective ones of said tools for performing framing operations in accordance with a determined framing pattern.

2. A pole framing apparatus in accordance with claim 1 wherein multiple programs are interchangeable to perform different framing operations in accordance with varying desired framing patterns.

3. A pole framing apparatus as defined in claim 2 wherein a first centering device is provided adjacent to and preceding said tool holder ring to center the poles in the ring whereby the axis of the poles substantially coincide with the axis of the ring.

4. A pole framing apparatus as defined in claim 3 wherein said first centering device is comprised of opposed centering vee supports, rollers provided on the legs of the vee supports to allow feeding of the poles through the vee supports and through the ring upon movement of the carriage.

5. A pole framing apparatus as defined in claim 4 wherein a second centering device is provided adjacent and following the ring whereby the axis of the pole is maintained in a position substantially along the axis of the ring as the pole travels between the two centering devices.

6. A pole framing apparatus as defined in claim 5 wherein a second rotatable tool holding ring is provided between said centering devices, multiple drilling tools provided on said second ring, said programmable control controlling said ring and drilling tools for drilling ground line drill holes in the base of the pole.

7. A pole framing apparatus as defined in claim 5 wherein said longitudinal feed station includes a track, a retractable first support positioned over said track preceding said first centering device, a motorized second support and pole end clamping member movably entrained on the track, said motorized second support responsive to said programmable control to position said motorized second support and pole end clamping member strategic to an end of the pole, said first and second supports cooperatively receiving and supporting a pole to be framed, said supports supporting the pole at the ends thereof and permitting rotation of the pole as may be dictated by gravity action to orient the pole in an upwardly concave position, said pole clamping member adapted to clamp the pole end and said retractable support being retractable in response to said control whereby the tool ring is fed along the length of the pole to feed the pole through said centering devices and through said tool holder ring.

8. A pole framing apparatus as defined in claim 7 wherein a primary conveyor conveys unframed poles laterally to said longitudinal feed station, said primary conveyor responsive to said programmable control to deposit poles in sequence onto said first and second support of said longitudinal feed station.

9. A pole framing apparatus as defined in claim 7 wherein a first scanner is positioned relative to the primary conveyor to verify the length of the unframed poles and verification thereof to said programmable controls.

10. A pole framing apparatus as defined in claim 9 wherein a second scanner is provided relative to the longitudinal feed station to detect the leading end of the pole to be fed through the ring and to transmit the detection of said leading end to the programmable control whereby the exact length and location of the pole is determined.

11. A pole framing apparatus as defined in claim 7 wherein the pole clamping member is rotatable for selective reorientation of the clamped pole.

* * * * *